April 14, 1959     E. E. MEUSY     2,881,779
FLOW CONTROL APPARATUS

Filed Jan. 4, 1955     2 Sheets-Sheet 1

INVENTOR.
Eugene E. Meusy
BY
Seegert & Schwalbach
Attys

INVENTOR.
Eugene E. Meusy
BY
Seegert & Schwalbach
Att'ys

United States Patent Office 2,881,779
Patented Apr. 14, 1959

2,881,779

FLOW CONTROL APPARATUS

Eugene E. Meusy, Milwaukee, Wis., assignor to Baso Inc., Milwaukee, Wis., a corporation of Wisconsin Application January 4, 1955, Serial No. 479,820

11 Claims. (Cl. 137—66)

This invention relates to flow control apparatus and more particularly to unitary control means for manual control of fluid flow and automatic shut-off thereof upon occurrence of a predetermined condition.

A primary object of the present invention is to provide a unitary control device for fluid fuel burners, wherein such device affords flow interruption of fuel flow to a main burner during ignition of a pilot burner, 100 percent shut-off of fuel flow upon extinguishment of the pilot flame and ready removability of the safety shut-off unit without need for shutting off the flow of fuel upstream of the control device.

Another object is the provision of a valve device of the class described having a single plug valve for control of fuel flow upstream and downstream of a safety shut-off valve whereby said plug valve is operable to provide flow interruption during pilot ignition and shut-off of 100 percent of the fuel flow upstream of said safety shut-off valve to permit removal of the latter for repair or replacement without coincidental escape of fuel.

Another object is to provide a small compact flow control device capable of providing flow interruption of fuel flow to a main burner during ignition of a pilot burner and 100 percent shut-off of fuel flow upon occurrence of a predetermined condition.

Another object of the present invention is to provide a unitary control device having a manually operable flow control member formed with a relatively large cavity and safety shut-off means having a valve member operable within the cavity of said flow control member to provide safety shut-off of fuel flow upon occurrence of a predetermined condition.

Another object is to provide a unitary valve device as aforedescribed having flow interrupter means to shut off main fuel flow during ignition of a pilot burner.

Another object is to provide a unitary valve device as aforedescribed having a resilient safety shut-off valve member for cooperation with the cavity in said flow control device, said resilient valve member capable of being deformed in order to assume the shape of said cavity whereby adherence to close dimensional tolerances is not required during the manufacture of the flow control member or the safety shut-off member.

Another object is to provide a device of the aforementioned character wherein the safety shut-off valve member is retained partially within the cavity formed in said flow control member when in reset position to thereby eliminate undue turbulence of fuel flow through said cavity, which turbulence has been found to have a detrimental effect on the capacity of the device.

A further object of the present invention is to provide a unitary control device of the above nature which is simple in construction, inexpensive to manufacture and easy to operate.

The novel features which I consider characteristic of my invention are set forth with particularity in the appended claims. The device itself, however, both as to its organization and mode of operation, together with additional objects and advantages thereof, will best be understood from the following description of a specific embodiment when read in connection with the accompanying drawings, in which:

Like reference characters indicate corresponding parts throughout the several views of the drawings.

Figure 1:
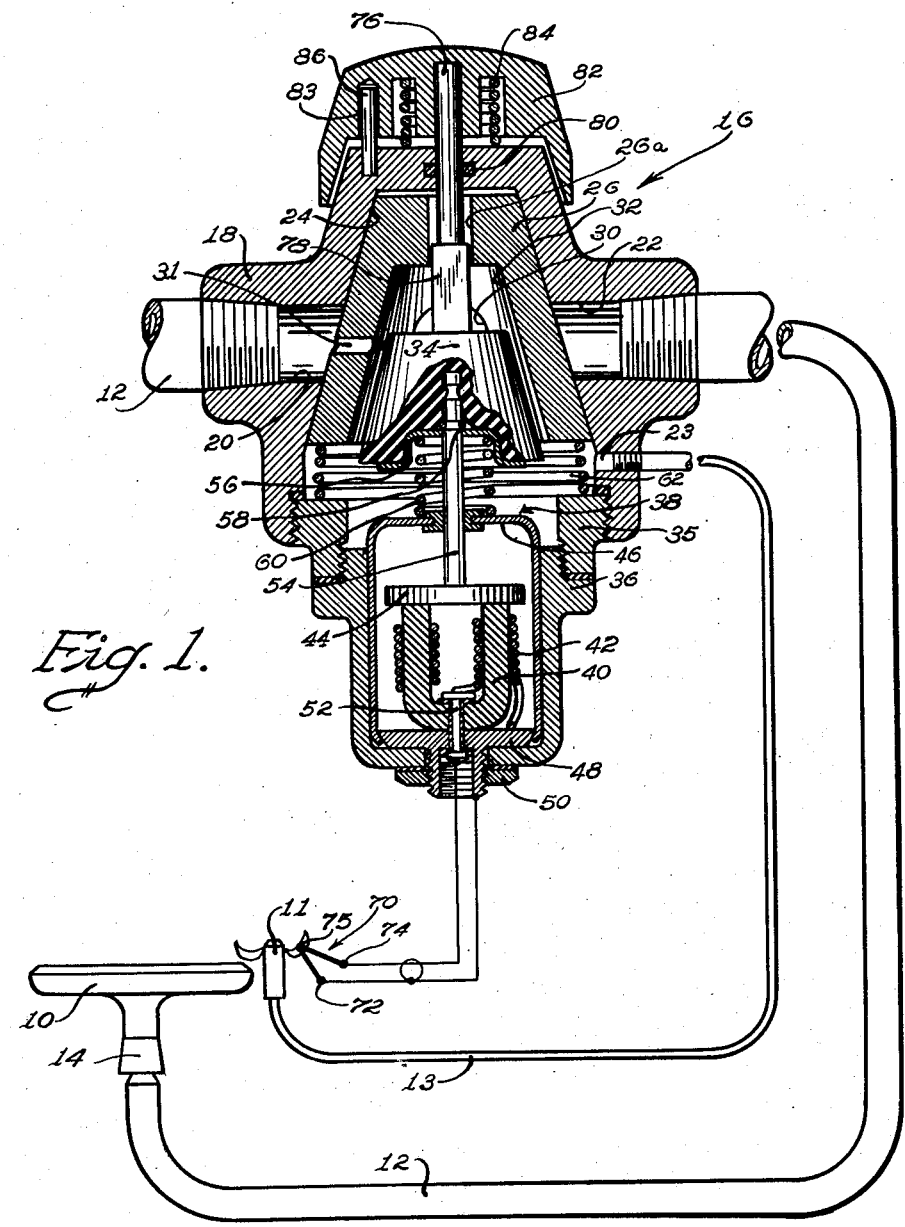
Figure 1 is a sectional view taken along a vertical center line of a valve device embodying the present invention showing the plug valve in "pilot" position and reset mechanism and safety shut-off means in reset position.

Referring to Figure 1 of the drawings, the numeral 10 designates a main burner which may be for use in a room or space heater, or for use in a water heater, a floor furnace, an oven burner, one or more stove top burners, or for use in any other suitable fluid fuel burning device or apparatus. A fuel supply conduit 12 leads to main burner 10 for delivery of gaseous or other fluid fuel thereto, for example through a mixing chamber 14 through which air is admitted through adjustable inlets (not shown), as is well understood in the art. A unitary safety shut-off and fluid flow control device designated in its entirety at 16 is interposed in the fuel supply conduit 12 for control of the fuel supply to said main burner 10 and to a pilot burner 11 as will hereinafter appear. The pilot burner 11 is fixed to one end of a fuel supply conduit 13 and is positioned adjacent main burner 10 in heating relation therewith to afford ignition of said main burner 10 in a manner well known in the art.

The unitary safety shut-off and fuel flow control device 16 comprises a main valve body 18 formed with an inlet opening 20, a main outlet opening 22 and a pilot or auxiliary outlet opening 23. The conduit 13 is fixed to the valve body 18 within said pilot outlet opening 23. The valve body 18 is further formed with a cavity 24 which may be frusto-conical in shape and which interconnects said inlet 20 and outlets 22 and 23 to provide communication therebetween.

Figure 2:
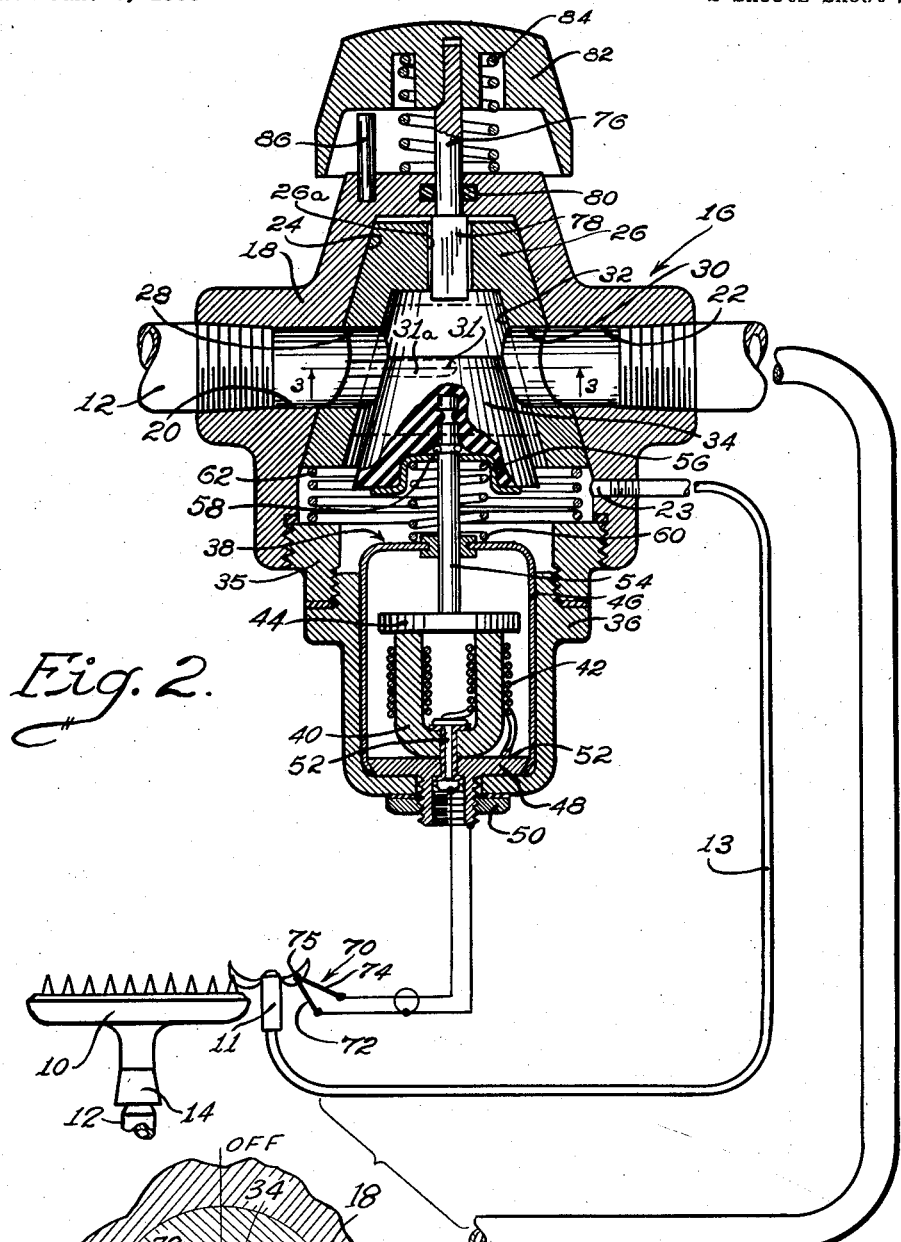
Figure 2 is a sectional view taken along the same center line as Figure 1, but showing the reset mechanism in retracted position and the plug valve in "on" position.
Figure 3:
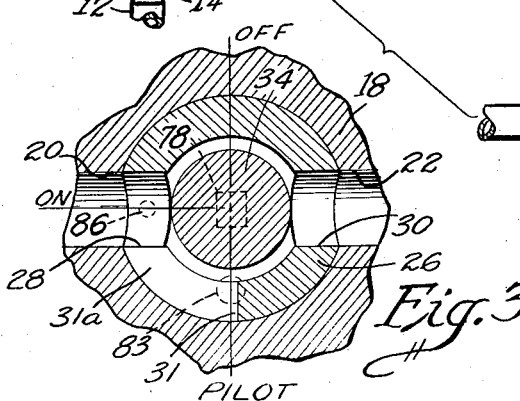
Figure 3 is a transverse sectional view of the plug valve taken along line 3—3 of Figure 2.

Positioned within said cavity 24 of main body 18, is a flow control member or plug valve 26 formed with an inlet port 28 for registration with inlet opening 20, and an outlet port 30 for registration with main outlet opening 22 (Figures 2 and 3). The plug valve 26 is also formed with a cavity 32 which may be frusto-conical in shape and which provides communication between inlet port 28 and outlet port 30 and between inlet port 28 and pilot outlet opening 23. In order to provide interruption of fuel flow to main burner 10 during ignition of pilot burner 11, I provide plug valve 26 with a pilot port 31 having communication with cavity 32 and positioned in the wall of valve 26 so as to register with inlet opening 20 while said valve is in "pilot" position and the outlet port 30 is therefore out of registration with outlet opening 22 in valve body 18. As will be further explained with reference to the operation of device 16, this arrangement affords fuel flow to pilot burner 11 for ignition thereof, while preventing fuel flow to main burner 10 to thus provide flow interruption during resetting. A slot 31a is also formed in valve 26 and extends from pilot port 31 to inlet port 28 so that plug valve 26 may be moved from its "pilot" position, wherein pilot port 31 is in registration with inlet opening 20, to its "on" position, wherein inlet port 28 is in registration with said inlet opening 20, without interruption of fuel flow to pilot burner 11.

A valve member 34 formed of resilient or elastic material is positioned within cavity 32 for cooperation with plug valve 26 to provide interruption of fuel flow to both main burner 10 and pilot burner 11 upon occurrence of a predetermined condition. The valve member 34 is formed of resilient material to afford gas-tight seating engagement thereof within the cavity 32 without requiring adherence to close dimensional tolerances during manufacture of either of said valve members 26 and 34. The valve member 34 and cavity 32 may take any desired shape or form, it merely being necessary for the valve to firmly seat within cavity 32 in order to interrupt the aforementioned fuel flow.

The open end of cavity 24 of main body 18 is formed with fastening means such as threads for receiving a spring retainer 35. Threadably secured to retainer 35 is a mounting nut 36. A hood assembly 38 comprising a U-shaped core member 40, an electromagnet winding 42, and an armature 44 for cooperation with said core member 40, is positioned within mounting nut 36 as shown in Figures 1 and 2. Said hood assembly 38 further comprises an enclosure 46 and mounting plate 48 for completely enclosing the aforementioned hood assembly parts as a single unit. As shown in the drawings, said mounting plate 48 is formed with an extended tubular portion which may be formed with external threads affording mounting of the hood assembly 38 on mounting nut 36 as by means of nut 50.

As shown in Figures 1 and 2, I prefer to use a sealing ring or washer between valve body 18 and spring retainer 35, between retainer 35 and mounting nut 36, and between mounting nut 36 and nut 50 to provide a gas-tight seal preventing escape of fluid fuel during operation of flow control device 16.

A rivet 52 insulatedly positioned within core member 40 and mounting plate 48 is employed as a terminal member and as fastening means to rigidly fasten said core member 40 in a given position within enclosure 46. One end of electromagnet winding 42 is fastened to rivet 52 as by means of soldering or other form of welding, while the other end thereof is fastened in any well known manner to mounting plate 48.

A valve stem 54 extending through an opening in the end wall of enclosure 46 interconnects valve member 34 and armature 44 as clearly shown in the drawings. In order to provide a flexible hinge connection between valve member 34 and stem 54, I prefer to form said valve member 34 with an opening having an annular ridge for engagement with an annular groove formed in stem 54. Such connection permits valve member 34 to be tilted with respect to stem 54 as required to insure maximum gas-tight seating of valve member 34 within the cavity of plug valve 26. It is also necessary that valve member 34 be rotatable with plug valve 26 while in seating engagement therewith to maintain the gas-tight engagement therebetween during rotation of said valve 26 from its "off" position to its "pilot" position prior to the resetting operation.

Because of the resilient nature of valve member 34, I prefer to employ a back-up plate 56 on one side thereof to provide a firm surface against which a reset return spring 60 may exert its force. Said back-up plate 56 is formed with an opening having a loose fit with respect to valve stem 54. In order to relieve resilient valve member 34 of the force of such compression spring 60, I employ a snap ring 58 positioned within an annular groove formed in stem 54 between back-up plate 56 and valve member 34.

The spring 60 is interposed between back-up plate 56 and enclosure 46 to effect return of valve member 34 to its flow-preventing position upon occurrence of a predetermined condition as will be hereinafter more fully explained. A compression spring 62 is interposed between spring retainer 35 and valve 26 to maintain firm seating engagement of said plug valve 26 within cavity 24.

A thermoelectric generator or thermocouple 70 formed of dissimilar metals 72 and 74 and having a "hot" junction 75 is positioned adjacent pilot burner 11 in heating relation therewith, and as shown schematically in the drawings, is connected in series circuit relation with the electromagnet winding 42 through rivet 52 and mounting plate 48, for example by means of a coaxial type lead.

An operating stem 76 having both rotational and rectilinear movement within an opening formed in main body 18, is provided with an end portion 78 having rectilinear movement within an opening 26a formed in plug valve 26 while being non-rotatable with respect thereto to afford rotation of said valve 26 as will hereinafter appear. In the drawings, end portion 78 is shown as being formed with a substantially square transverse cross-section for cooperation with a square-shaped opening formed in valve member 26, although it is believed readily apparent that stem 76 may be keyed to said valve 26 in any desired manner which permits of rectilinear movement with respect thereto while preventing rotational movement relative thereto. I prefer to employ an O-ring 80 to prevent escape of fluid between operating stem 76 and main body 18. An operating handle 82 is rigidly secured to the external end of stem 76 for manual operation of the latter as will hereinafter be explained. A compression spring 84 is interposed between handle 82 and main body 18 to effect return of operating stem 76 to its retracted position following resetting of hood assembly 38.

A pin 86 for sliding movement within an opening 83 formed in handle 82 is rigidly secured to main body 18 as shown in the drawings. Such sliding engagement between pin 86 and opening 83 (Figure 1) is permitted to occur only while handle 82 is in its "pilot" position thus insuring against resetting of said safety shut-off device in all positions other than "pilot" position of plug valve 26. The designations "pilot," "on" and "off" of Figure 3 refer to the position of plug valve 26 and operating handle 82 with respect to pin 86; wherefore rotation of operating handle 82 so that the center line designated as "on" is aligned with pin 86 as shown in Figure 3 places plug valve 26 in "on" position wherein port 28 is in registration with opening 20 and port 30 is in registration with opening 22. Although not specifically shown in the drawings, I prefer to mark operating handle 82 with the words "on," "pilot" and "off" and to place an indicating mark or arrow on valve body 18 adjacent pin 86 so that valve body 26 can be moved to any desired position by merely aligning the appropriate designating word with such indicating mark as is well understood in the art.

The operation of the apparatus shown in the drawings is as follows:

In order to effect ignition of the main burner 10 following termination of fuel flow to both the main and pilot burners, it is first necessary to rotate handle 82 to its "pilot" position. In addition to aligning pin 86 with opening 83 in handle 82 in order to permit of subsequent resetting movement of said handle, such rotation effects registration of pilot port 31 with opening 20 to permit fuel to flow to cavity 32 during such resetting movement. With handle 82 in "pilot" position, however, fuel flow to main burner 10 is prevented due to a lack of registration between outlet opening 22 and the ports formed in valve plug 26.

Rectilinear movement of handle 82 will then move operating stem 76 into engagement with valve member 34. Continued movement of stem 76 causes valve member 34 to be moved to its flow-permitting position and armature 44 to be moved to its attracted position with respect to magnet core 40, as clearly shown in Figure 1. With valve member 34 in its flow-permitting position, fuel is permitted to flow through opening 20, pilot port 31, cavity 32, auxiliary outlet 23 and conduit 13 to pilot burner 11. The fuel thus emitted from pilot burner 11 may be ignited in any desired manner.

Ignition of pilot burner 11 affords heating of the "hot" junction 75 of thermoelectric generator 70 thus causing an electric current to flow through electromagnet winding 42. Such current flow magnetizes core member 40 causing armature 44 to be held in its attracted position with respect thereto. Operating stem 76 may then be released, whereupon compression spring 84 will return operating handle 82 and operating stem 76 to their retracted positions.

With pilot burner 11 ignited, it is merely necessary to rotate operating handle 82 to its "on" position as shown in Figure 2 in order to effect registration of outlet port 30 with outlet opening 22 and inlet port 28 with inlet opening 20. Fuel flow to pilot burner 11 is not interrupted during such movement of operating handle 82 because of slot 31a which interconnects port 31 and port 28.

It is seen that in addition to the aforementioned gas flow to pilot burner 11, fuel is now permitted to flow from cavity 32 through port 30, opening 22, and conduit 12 to main burner 10. The fuel thus emitted from main burner 10 is ignited by the flame of pilot burner 11.

The amount of heat afforded by the flame of main burner 10 may be varied by merely adjusting operating handle 82 so as to vary the degree of registration between port 30 and opening 22 thereby varying the amount of fuel permitted to flow to main burner 10 and hence the size of the flame thereof.

Upon extinguishment of the flame of pilot burner 11, "hot" junction 75 of thermoelectric generator 70 is cooled by the surrounding atmosphere thereby decreasing the energization of electromagnet winding 42 to a point where the magnetic effect of core member 40 on armature 44 is insufficient to maintain armature 44 in its attracted position. When this condition prevails, spring 60 causes valve member 34 to be returned to its flow-preventing position thereby interrupting fuel flow to both main burner 10 and pilot burner 11 thus affording 100 percent shut-off.

Under certain conditions, it may be desirable to remove the safety shut-off unit of the aforedescribed control device for purposes of repair or replacement of various of the parts of hood assembly 38 or valve member 34. In this event it is merely necessary to rotate handle 82 to "off" position wherein plug valve 26 prevents fluid flow through inlet port 20. Mounting nut 36 may then be removed from spring retainer 35 thereby removing hood assembly 38 and shut-off valve member 34 as a unit without effecting escape of fuel to the surrounding atmosphere. It is thus seen that the present invention utilizes a single plug valve for control of fuel flow both upstream and downstream of the safety shut-off valve and eliminates need for a separate manually operable shut-off valve upstream of the control device.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A unitary safety shut-off and fluid flow control device comprising, a valve body formed with a cavity and having an inlet and main and pilot outlets in communication therewith, a first valve member within said cavity and operable between flow-permitting and flow-preventing positions of fluid flow between said inlet and main outlet, said first valve member being formed with an outlet port for registration with said main outlet as desired and having a cavity providing communication between said inlet and outlet port and between said inlet and pilot outlet, safety shut-off means comprising a second valve member having a surface complemental to a surface of said cavity formed in said first valve member for seating engagement within said cavity upon occurrence of a predetermined condition to prevent fluid flow between said inlet and main outlet and between said inlet and pilot outlet irrespective of the position of said first valve member, means associated with said second valve member for moving and retaining said second valve member a predetermined distance from its flow-preventing position within said cavity whereby said second valve member remains at least partially within said cavity to prevent occurrence of undue turbulence of fluid flow therethrough, said last-mentioned means including an operating handle rotatable to effect operation of said first valve member between its said flow-permitting and flow-preventing positions and reciprocatable to effect movement of said second valve member to its reset position and reset preventing means to prevent resetting of said second valve member unless said first valve member is in position preventing flow between said inlet and main outlet.

2. A fluid flow control device comprising, a valve body having an inlet, an outlet and an auxiliary outlet, a movable flow control member in said valve body having first and second portions for cooperation respectively with said inlet and outlet for control of fluid flow respectively therethrough, resettable safety shut-off means within said body for preventing flow through said inlet upon occurrence of a predetermined condition, means movable in a first direction to reset said safety shut-off means for permitting flow through said inlet and movable in a second direction to move said flow control member to vary the flow through said inlet and outlet, and means preventing resetting of said safety shut-off means unless said second portion is positioned to prevent flow through said outlet, said flow control member being positionable independent of said safety shut-off device to permit flow through both said inlet and outlet following resetting, said flow control member being further positionable to prevent flow through said inlet to permit removal of said safety shut-off means without effecting coincidental escape of fluid.

3. A fluid flow control device comprising, a valve body having an inlet, an outlet and an auxiliary outlet, a movable shut-off cock in said valve body having first and second portions for cooperation respectively with said inlet and outlet for control of fluid flow respectively therethrough, resettable safety shut-off means within said cock between said first and second portions for preventing flow through said inlet upon occurrence of a predetermined condition, means movable in a first direction to reset said safety shut-off means for permitting flow through said inlet and movable in a second direction to move said shut-off cock to vary the flow through said inlet and outlet and means preventing resetting of said safety shut-off means unless said second portion is positioned to prevent flow through said outlet, said shut-off cock being positionable independent of said safety shut-off device to permit flow through both said inlet and outlet following resetting, said shut-off cock being further positionable to prevent flow through said inlet to permit removal of said safety shut-off means without effecting coincidental escape of fluid.

4. A fluid flow control device comprising, a valve body having an inlet, an outlet and an auxiliary outlet, a movable plug valve in said valve body having first and second portions for cooperation respectively with said inlet and outlet for control of fluid flow respectively therethrough, resettable electromagnetic safety shut-off means including a safety shut-off valve member within said plug valve between said first and second portions and a thermoelectric generator subject to the heat of a flame for preventing flow through said inlet upon extinguishment of said flame, means movable in a first direction to reset said safety shut-off means for permitting flow through said inlet and movable in a second direction to move said plug valve to vary the flow through said inlet and outlet, and means preventing resetting of said safety shut-off means unless said second portion is positioned to prevent flow through said outlet, said plug valve being positionable independent of said safety shut-off device to permit flow through both said inlet and outlet following resetting, said plug valve being further positionable to prevent flow through said inlet to permit removal of said safety shut-off means without effecting coincidental escape of fluid.

5. A fluid flow control device comprising, a first flow control member movable between flow-permitting and flow-preventing positions, a second flow control member cooperable with said first flow control member and having a flow-permitting position and a flow-preventing position in engagement with said first flow control member, and resettable condition responsive operating means for said second flow control member including holding means operable when reset to hold said second flow control member in its flow-permitting position and responsive to a given condition to permit return of said second flow control member to its flow-preventing position in engagement with said first flow control member to prevent flow of fluid through said device regardless of the position of said first flow control member, said first flow control member being positionable to prevent fluid flow through said device regardless of the position of said second flow control member to permit removal of said second flow control member and operating means therefor without effecting coincidental escape of fluid.

6. A fluid flow control device comprising, a first flow control member having passage means for flow of controlled fluid therein, said first member being movable between flow-permitting and flow-preventing positions, a second flow control member cooperable with said first flow control member and having a flow-permitting position and a flow-preventing position in engagement with said first flow control member to prevent flow of the controlled fluid through said passage means, and resettable condition responsive operating means for said second flow control member for movement thereof from its flow-permitting position to its flow-preventing position in engagement with said first flow control member to prevent flow of fluid through said passage means, and hence through said device regardless of the position of said first flow control member, said first flow control member being positionable to prevent fluid flow through said device regardless of the position of said second flow control member to permit removal of said second flow control member and operating means therefor without effecting coincidental escape of fluid.

7. A unitary safety shut-off and fluid flow control device comprising, a valve body formed with a fluid passage, a first flow control member formed with means including a cavity and positionable in said body to selectively afford and prevent communication between said cavity and said passage to respectively permit and prevent fluid flow through said cavity and fluid passage, a second flow control member having a surface formed complementally of a surface of said cavity for seating engagement therewithin to prevent fluid flow therethrough, said second flow control member being movable from said seating engagement to permit fluid flow through said cavity, and resettable condition responsive operating means for said second flow control member including holding means operable when reset to hold said second flow control member from its said seating engagement within said cavity and operable upon occurrence of a given condition to permit return of said second flow control member to seating engagement therewithin to prevent fluid flow through said cavity and hence to prevent fluid flow in said passage irrespective of the position of said first flow control member, actuating and reset means operatively associated with said first and second flow control members and movable in one direction to effect movement of said first flow control member from its said communication-preventing position toward its communication-permitting position, said means being movable in another direction to reset said safety shut-off means, and means preventing movement of said actuating and reset means in said another direction to move said second flow control member toward its flow-permitting position until after said first flow control member has been moved away from its said communication-preventing position by movement of said actuating and reset means in said one direction.

8. A unitary safety shut-off and fluid flow control device comprising, a valve body formed with a fluid passage, a first flow control member formed with means including a cavity and positionable in said body to selectively afford and prevent communication between said cavity and said passage to respectively permit and prevent fluid flow through said cavity and fluid passage, a second flow control member formed of resilient material and having a flow-preventing position within said cavity wherein said second flow control member resiliently conforms to the shape of said cavity to prevent fluid flow therethrough, said second flow control member also having a flow-permitting position, and resettable condition responsive operating means for said second flow control member including holding means operable when reset to hold said second flow control member in its flow-permitting position and operable upon occurrence of a given condition to permit return of said second flow control member to its flow-preventing position within said cavity to prevent fluid flow therethrough and hence to prevent fluid flow in said passage irrespective of the position of said first flow control member, actuating and reset means operatively associated with said first and said second flow control members and movable in one direction to effect movement of said first flow control member from its said communication-preventing position toward its communication-permitting position, said means being movable in another direction to reset said safety shut-off means, and means preventing movement of said actuating and reset means in said another direction to move said second flow control member toward its flow-permitting position until after said first flow control member has been moved away from its said communication-preventing position by movement of said actuating and reset means in said one direction.

9. A fluid flow controlling device comprising a valve body having an inlet and a main outlet, a movable flow control member in said valve body having portions cooperable with said inlet and outlet for control of fluid flow therethrough, resettable shut-off means within said body having a flow-permitting position and movable to a shut-off position preventing flow through said inlet, means movable in a first direction to reset said shut-off means to flow-permitting position and movable in a second direction to move said flow control member to vary the flow through said inlet and outlet, and means preventing movement of said last-mentioned means in said first direction unless said flow control member is positioned to prevent flow through said outlet, said flow control member being positionable independent of said shut-off means to permit flow through both said inlet and outlet following resetting, said flow control member being further positionable to prevent flow through said inlet to permit removal of said shut-off means without effecting coincidental escape of fluid.

10. A fluid flow controlling device comprising a valve body having an inlet and a main outlet, a movable flow control member in said valve body having portions cooperable with said inlet and outlet for control of fluid flow therethrough, resettable shut-off means within said body having a flow-permitting position and movable to a shut-off position preventing flow through said inlet, means movable linearly in a first direction to reset said safety shut-off means to flow-permitting position and movable rotatably in a second direction to move said flow control member to vary the flow through said inlet and outlet, and means preventing linear movement of said last-mentioned means in said first direction unless said flow control member is positioned to prevent flow through said outlet, said flow control member being positionable independent of said shut-off means to permit flow through both said inlet and outlet following resetting, said flow control member being further positionable to prevent flow through said inlet to permit removal of said shut-off means without effecting coincidental escape of fluid.

11. A fluid flow controlling device comprising a valve body having an inlet, a main outlet and an auxiliary outlet, a movable flow control member in said valve body having portions cooperable with said inlet and main outlet for control of fluid flow therethrough, resettable shut-off means within said body having a flow-permitting position and movable to a shut-off position preventing flow through said inlet, means movable in a first direction to reset said shut-off means to flow-permitting position and movable in a second direction to move said flow control member to vary the flow through said inlet and outlet, and means preventing movement of said last-mentioned means in said first direction unless said flow control member is positioned to prevent flow through said main outlet, said flow control member being positionable independent of said shut-off means to permit flow therethrough from said inlet to both of said main and auxiliary outlets following resetting, said flow control member being further positionable to prevent flow through said inlet to permit removal of said shut-off means without effecting coincidental escape of fluid.

References Cited in the file of this patent

UNITED STATES PATENTS

| | | |
|---|---|---|
| 1,911,759 | Lenktis | May 30, 1933 |
| 2,186,791 | Willgoos | Jan. 9, 1940 |
| 2,213,844 | Mantz | Sept. 3, 1940 |
| 2,556,337 | Paille | June 12, 1951 |
| 2,636,505 | Paille | Apr. 28, 1953 |
| 2,700,985 | Gleasman | Feb. 1, 1955 |

FOREIGN PATENTS

| | | |
|---|---|---|
| 32,528 | Switzerland | June 6, 1905 |